T. REID.
BICYCLE FRAME.
APPLICATION FILED OCT. 13, 1915.
1,199,609.
Patented Sept. 26, 1916.
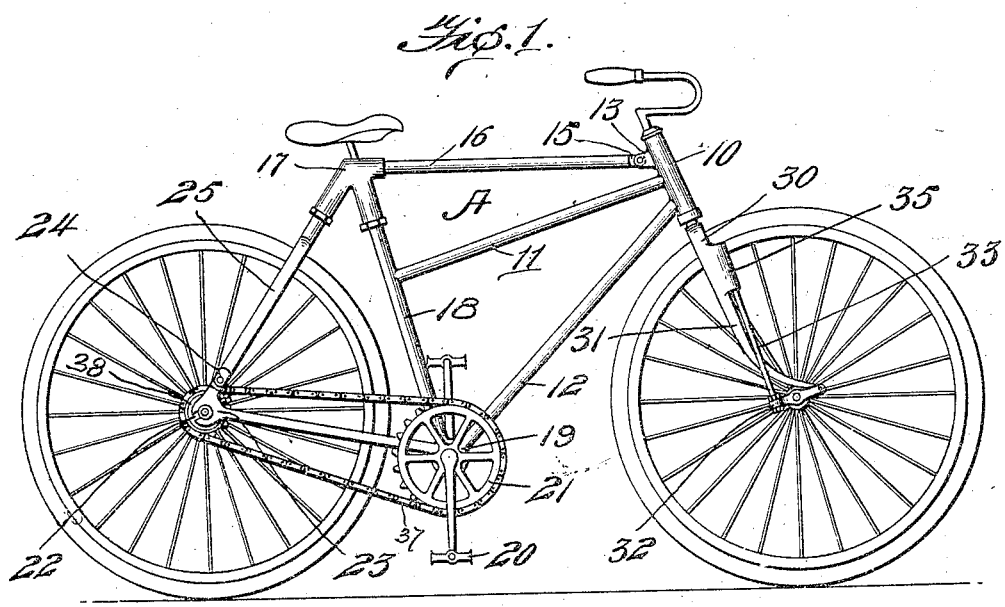
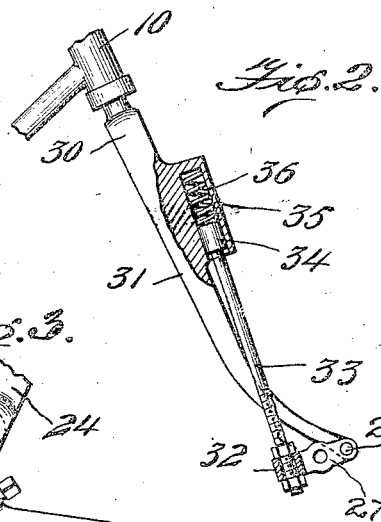
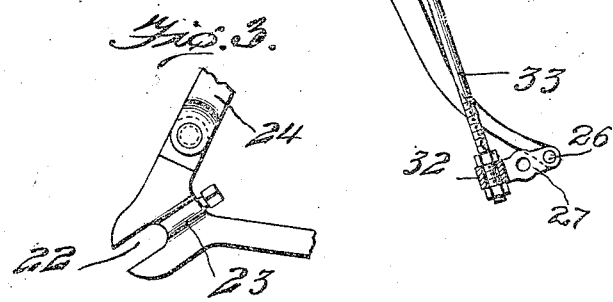
Inventor
Thomas Reid
Witnesses
By
Attorney

UNITED STATES PATENT OFFICE.

THOMAS REID, OF MOORESVILLE, NORTH CAROLINA.

BICYCLE-FRAME.

1,199,609.  Specification of Letters Patent.  Patented Sept. 26, 1916.

Application filed October 13, 1915. Serial No. 55,650.

*To all whom it may concern:*

Be it known that I, THOMAS REID, a citizen of the United States, residing at Mooresville, in the county of Iredell and State of North Carolina, have invented certain new and useful Improvements in Bicycle-Frames, of which the following is a specification.

The invention relates to a bicycle, and more particularly to the class of resilient forks for bicycle frames.

The primary object of the invention is the provision of a bicycle of this character, wherein the front fork is of novel construction, so as to give the required resiliency thereto for absorbing shocks and jars incident to the travel of the bicycle over uneven surfaces, thereby assuring comfort to the rider of the bicycle.

Another object of the invention is the provision of a bicycle of this character, wherein the front fork thereof is constructed, so as to possess maximum resilient qualities, yet it will withstand excessive strains, and at the same time absorb undue shocks and jars, to relieve the same from the rider of the bicycle.

A further object of the invention is the provision of a bicycle of this character, which is extremely simple in construction, thoroughly reliable and efficient in operation, strong, durable, and inexpensive in manufacture.

With these and other objects in view the invention consists in the features of construction, combination and arrangement of elements and parts, as will be hereinafter fully described, illustrated in the accompanying drawing, and pointed out in the claim hereunto appended.

In the accompanying drawing: Figure 1, is a side elevation of a bicycle constructed in accordance with the invention. Fig. 2, is a fragmentary elevation, showing the front fork partly in section. Fig. 3, is a detail view showing the connection of the upper and lower sections of the rear fork.

Similar reference characters indicate corresponding parts throughout the several views in the drawing.

Referring to the drawing in detail, A, designates generally the frame of the bicycle, which frame is of any desirable construction, although in this instance, comprises the head 10, having rigidly attached thereto the rearwardly inclined tubes or bars 11, and 12, respectively. Above the tube or bar 11, is the top tube or bar 16, which is connected to a three-way coupling 17, mounted upon the rearwardly inclined tube or post 18, having joined therewith the tubes or bars 11, and 12, the tube or bar 12, being joined through the medium of a crank case 19, which has journaled therein as usual the crank shaft carrying pedals 20, and the large sprocket wheel 21.

The rear wheel of the bicycle is adjustably mounted in the usual inclined slots 22, formed in the juncture between the lower and upper sections 23, and 24, respectively of the rear fork 25.

Mounted in the head 10, of the frame A, is the stem of the front turning fork 30, having the resilient limbs 31, between which is journaled the front steering wheel, as usual, said limbs 31, each at its lower end being pivoted, as at 26, to the forward end of a hanger member 27, which is carried on the axle for the front wheel. Each member 27, is formed at its rear end with an eye 32, in which is adjustably engaged the lower end of a plunger rod 33, formed with a plunger head 34, which is slidably fitted within the bore in a cylinder or sleeve 35, and these cylinders or sleeves are formed integral with the upper portions of the limbs 31, of the fork, as shown.

Within each cylinder or sleeve 35, is a coiled compression spring 36, which is seated against the closed end of the bore in the cylinder or sleeve and the plunger head 34, and serves to absorb all shocks and jars when imparted to the limbs 31, of the fork 30. Thus it will be seen that in this manner these springs will act as auxiliary supporting members for the lower curved portions of the front fork when coöperating with the rods 33, having the plunger heads thereon.

Trained over the sprocket wheel 21, is the ordinary sprocket chain 37, which is also trained over the sprocket wheel 38, on the rear wheel of the bicycle, for the driving of the same as usual.

What is claimed is:

In a bicycle front turning fork having tapered resilient limbs, hanger members adapted to be mounted centrally thereof on the axle for the front steering wheel when arranged within the fork, said limbs being outwardly curved at their narrower ends, means connecting the front ends of the hanger members with the curved ends of the limbs, eyes formed on the rear ends of the hanger members, threaded plunger-rods passed through the eyes, lock nuts adjustably engaged on the plunger-rods and working against the eyes at opposite sides thereof, heads formed on the plunger-rods, cylinders having closed upper ends and open lower ends integrally formed with the limbs at their upper portions and slidably receiving the heads, and resilient compression springs confined within the cylinders and working against the heads and the closed ends of said cylinders.

In testimony whereof I affix my signature.

THOMAS REID.